United States Patent [19]
Hough et al.

[11] 3,753,390
[45] Aug. 21, 1973

[54] PERCUSSIVE PHOTOFLASH LAMP ARRAY WITH SELECTIVE ACTUATING MECHANISM

[75] Inventors: Harold L. Hough; Emery G. Audesse; Warren H. Hay, all of Salem, Mass.

[73] Assignee: GTE Sylvania Incorporated, Danvers, Mass.

[22] Filed: June 9, 1972

[21] Appl. No.: 261,534

[52] U.S. Cl. .................... 95/11 R, 431/92, 431/93, 240/1.3
[51] Int. Cl. ............................................ G03b 19/00
[58] Field of Search ................. 431/92, 93; 240/1.3; 95/11 L, 11 R

[56] References Cited
UNITED STATES PATENTS
3,602,618  8/1971  Michatek ............................ 431/93

*Primary Examiner*—Carroll B. Dority, Jr.
*Attorney*—Norman J. O'Malley et al.

[57] ABSTRACT

A photoflash assembly comprising a plurality of percussively-ignitable flashlamps arranged in a linear array with respectively associated reflectors and preenergized striker springs, a support member attached to an associated camera and adapted to slidably receive the flashlamp array, and an actuating mechanism retained in the support member for selectively conrolling the one or more lamps of the array to be fired in response to shutter operation. The selective actuating mechanism includes a channel member which is pivotally mounted parallel to the array and spring loaded within a recess of the support member. A spring-loaded sliding plate is retained in the channel with its position therealong being determined by engagement with one of the preenergized striker springs. Upon pivoting of the channel member in response to operation of the camera shutter, the slide plate releases the overlying striker spring to fire a corresponding one of the flashlamps. A spring-loaded latch enables the slide plate to be shifted so as to underlie two striker springs and thereby enable the firing of two lamps simultaneously. Subsequent to lamp firing, the spring-loaded plate automatically advances to the next preenergized striker spring.

19 Claims, 8 Drawing Figures

PATENTED AUG 21 1973 3,753,390

PERCUSSIVE PHOTOFLASH LAMP ARRAY WITH SELECTIVE ACTUATING MECHANISM

BACKGROUND OF THE INVENTION

This invention relates to multilamp photoflash devices and, more particularly, to an array of percussively ignitable photoflash lamps with means for selectively controlling the firing thereof.

The trend in photoflash devices has been toward the use of subminiature flashlamps (an envelope volume of less than 1 cubic centimeter) in compact, disposable, multilamp units to provide camera users with the advantages of greater convenience, compactness and portability. A currently popular flashlamp unit of this type is known generally in the trade as a flashcube, a specific embodiment of which is shown in U.S. Pat. No. 3,327,105, for example. The unit comprises a set of four flashlamps, each with its own reflector, mounted on a base and enclosed within a transparent cover, with each of the lamp-reflector assemblies facing a respective one of the four side walls of the cube. A spindle depends from the center of the flashcube base for operatively retaining the unit in a complementary receiving socket on a camera. In operation, the flashcube is sequentially rotated a quarter of a turn at a time, usually in response to each operation of the film advance mechanism of the camera, to successively place unused lamps in a firing position facing the object being photographed. Each of the flashlamps consists of an hermetically sealed, light transmitting glass envelope containing a filamentary combustible material, such as shredded zirconium foil, and a combustion supporting gas, such as oxygen. In electrically ignited lamps, a pair of lead-in wires pass through the lamp envelope to support therein a filament in combination with globules of ignition paste, or a primer bridge, or a spark gap arrangement. The filament type flashlamp is generally energized by a battery power source, whereas the primer bridge or spark gap lamp may be employed with a dynamo or piezoelectric crystal. When the flashcube is in the firing position, segments of the lead-in wires disposed outside the lamp envelope are securely engaged with electrical contacts in the camera socket, which in turn are connected by wires and a shutter actuated switch to the camera power source, usually a pair of dry cell batteries. When a photographer actuates the shutter release mechanism to "snap" a picture, he also, by the same operation, closes the electrical circuit from the batteries to the ignition system in the lamp to thereby flash the lamp. The timing of the ignition of the combustible material in the lamp is synchronized with the exposure of the film by actuation of the shutter release so that efficient utilization of the light from the flashlamp may be obtained.

A not infrequent problem that has been faced by the average amateur photographer when using a battery operated flash system, however, has been failure of the lamp to fire due to weak batteries and/or dirt or corrosion on one or more of the electrical contacts in the system. To overcome this problem and provide improved flashlamp reliability, percussive-type flashlamps have been developed which may be mechanically fired without the need for batteries. As described in U.S. Pat. No. 3,535,063, for example, such flashlamps have a mechanical primer sealed in one end of the lamp in lieu of lead-in wires. This primer may comprise a metal tube extending from the lamp envelope and a charge of fulminating material on a wire supported in the tube. Operation of the percussive flashlamp is initiated by an impact onto the tube to cause deflagration of the fulminating material up through the tube to ignite the combustible disposed in the lamp envelope. The percussive-type lamps are also produced in subminiature envelope sizes and are employed in percussive flashcube units having respective preenergized striker springs associated with each lamp, as described in U.S. Pat. No. 3,597,604. The percussive flashcube is indexed into firing position similarly to the electrical flashcube, however, the flashlamp to be used is fired by virtue of a member associated with the camera shutter mechanism moving up through the flashcube base to release the respective preenergized striker spring, whereby it sharply impacts against the primer tube of the lamp.

Another development in the field of multilamp flash units for providing additional convenience and flexibility is the provision of a linear or planar array of electrically ignitable flashlamps.

In such an arrangement, a plurality of lamps face in the direction of the object being photographed whereby it is possible to more rapidly switch from one lamp to another or to flash more than one lamp at a time if additional light is required.

The sequence of lamp flashing is controlled by various electrical switching means including; manually controlled spring slide contacts; a rotary switch; thermally or chemically reactive switches placed in thermal proximity to the flashlamps; a switch within each lamp envelope which closes in response to firing to prepare the next lamp in sequence; a voltage surge across the lamps causes ignition of only the lamp having the lowest voltage break down characteristics; bimetallic switches; a meltable junction within each lamp envelope; and solid state switching circuits. Many of the lamp arrays are compactly interconnected with printed circuit cards to provide an integral plug-in unit which may be disposed of upon using all the lamps. Although electrical flashlamp arrays provide a number of advantages including more rapid ignition sequencing and simultaneous ignition, such arrays are still prone to the reliability problems associated with electrical flash systems, namely, ignition failures due to weak batteries and/or dirty or corroded electrical contacts. As discussed hereinbefore, such problems have previously been overcome in flashcube units by the use of percussive lamps with associated preenergized striker springs. There appears to be no prior art, however, with respect to the packaging and operation of percussive-type flashlamps in an array configuration.

SUMMARY OF THE INVENTION

Accordingly, it is an object of the present invention to provide an improved multiple photoflash lamp array which does not require rotation between successive flash operations.

A particular object of the invention is to provide a percussive flashlamp array with means for enabling rapid sequential ignition of the lamps or selective activation of more than one lamp simultaneously.

Another object is to provide an automatic mechanism responsive to successive actuations of a camera shutter for mechanically activating in sequence a linear array of percussive flashlamps.

A further object is to provide a selective actuating mechanism, which may be integrated with or removably attached to a camera of the type designed for use with percussive flashcubes, and a linear array of percussive flashlamps contained in a disposable flash unit adapted to be removably attached to the actuating mechanism.

Yet another object of the invention is to provide an actuating mechanism for a linear array of percussive flashlamps which selectively enables one or simultaneously two lamps to be fired in response to actuation of the camera shutter. Briefly, the present invention according to one of its embodiments provides a photoflash assembly comprising a plurality of percussively-ignitable flashlamps mounted in a row on a base member, along with a plurality of preenergized strikers associated with each of the lamps. The selective actuating mechanism for the array includes a channel member pivotally supported parallel to the row of flashlamps and a slide member retained in the channel and having means for engaging one of the preenergized strikers through access means defined by the base adjacent each of the strikers. Preferably, the pivotally mounted channel member is spring loaded, and means such as a spring is provided for urging the slide member toward one end of the channel member whereby the position of the slide is determined by its engagement with one of the preenergized strikers. To provide selective lamp flashing, the slide member is operative, upon pivotal displacement of the channel member by a camera actuating member, to release the striker with which it is engaged to fire a respective one of the flashlamps. Automatic sequencing is also provided, as release of the striker to fire a lamp disengages the spring loaded slide member to permit it to advance along the channel until it engages with the next preenergized striker.

The slide member may also be adjusted to fire two lamps simultaneously. More specifically, the slide member may comprise a plate having a releasable latch which normally engages one of the strikers. The strikers are mounted to project over an edge to the base, and the plate normally underlies only the projecting striker engaged by the latch. To enable the firing of two lamps at once, the latch is released to disengage it from the striker and permit the spring loaded plate to shift along the channel until it underlies at least two of the projecting strikers, whereby at least two of the strikers are released upon pivotal actuation of the channel member.

The assembly preferably includes a support member upon which the lamp array base may be removably mounted and which provides a means for pivotally supporting the channel member. The support member may be removably or integrally attached to a camera in a manner whereby the channel member is accessible to be pivotally displaced by a shutter responsive actuating member in the camera to cause the firing of a selected one or more of the flashlamps as determined by the position of the slide member.

BRIEF DESCRIPTION OF THE DRAWINGS

This invention will be more fully described hereinafter in conjunction with the accompanying drawings in which.

DESCRIPTION OF PREFERRED EMBODIMENT

Figure 1:
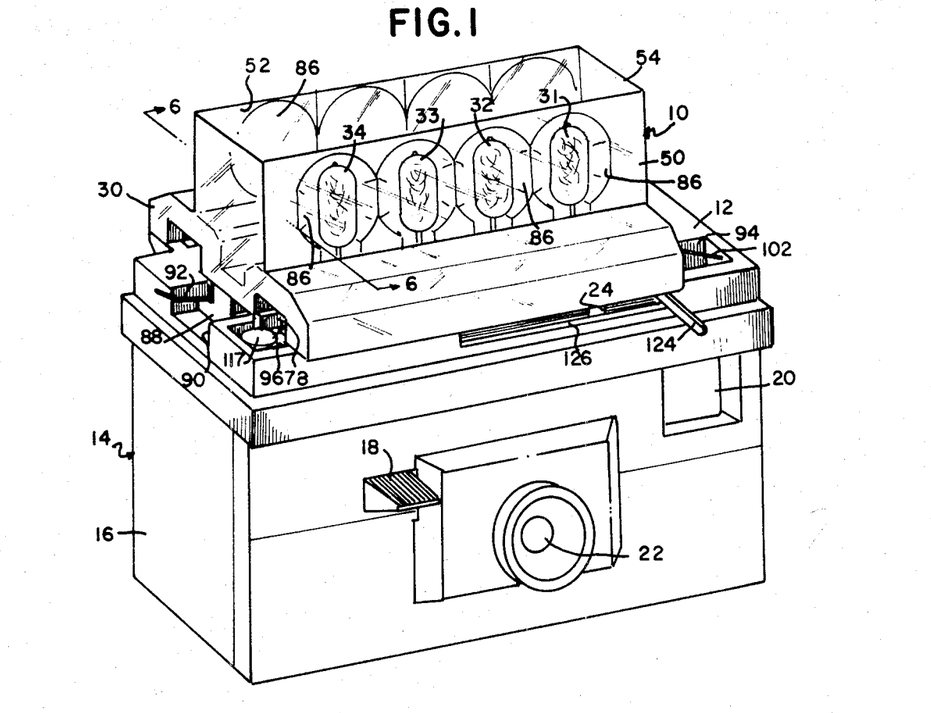
FIG. 1 is a perspective view of a photoflash assembly mounted on a camera in accordance with the invention; the assembly includes a percussive flashlamp array and a selective actuating mechanism.

Referring to FIG. 1, a percussive photoflash lamp array 10 is shown mounted upon a support member 12, which is attached to a still camera 14. The camera may be specifically designed for use with the percussive flashlamp array, in which case support member 12 may be integrally attached to camera 14, or the camera may be of the type generally available for use with percussive flashcubes, such as that described in U.S. Pat. No. 3,602,618 for example. In the latter case, the support member 12 may essentially comprise an array adapter which is removably attachable to the camera.

Figure 2:
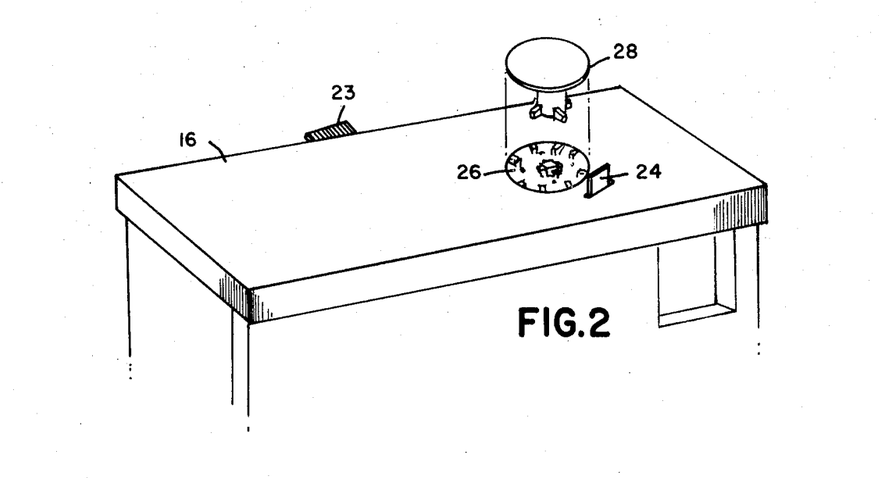
FIG. 2 is a partially exploded fragmentary view of the top portion of a flashcube camera adapted for use with the photoflash assembly of FIG. 1.

Briefly, camera 14 includes a box-like casing 16, a shutter release lever 18, a view finder having a front window 20 and a back, or view, window which is not visible in FIG. 1, and a lens 22. Contained within the camera is a spring-loaded shutter release and flash firing mechanism, such as that shown and described in the aforementioned U.S. Pat. No. 3,602,618. Accessible at the rear of the camera, and visible only in FIG. 2, is an oscillatable actuating member 23 for advancing film through the camera. As indicated in the above-mentioned patent, the camera mechanism may be designed whereby oscillation of the film advance member is operative to cock the shutter release mechanism. Thereafter, when lever 18 is manually depressed, the camera mechanism synchronously actuates the shutter to effect an exposure and mechanically transmits a flashlamp firing signal which results in the upward movement of a mechanical actuating member 24 through a slot in the top of the camera casing. As will be described in detail hereinafter, it is this vertical movement of member 24 which operates the actuating mechanism for the flashlamp array 10.

Referring to FIG. 2, the camera of the aforementioned U.S. Pat. No. 3,602,618 has a socket 26 provided on the top of casing 16 for receiving a percussive flashcube. As described in the patent, the camera mechanism is designed so that insertion of the flashcube into socket 26 causes upward movement of member 24 to an intermediate position for sensing purposes. This particular mode of sensing is not applicable to the flashlamp array described herein, however, the intermediate raised position of member 24 is desired for operation of the present mechanism. Accordingly, this type of camera may be adapted for use with array 10 and support member 12 by inserting into the camera socket 26 a "dummy" plug 28 which is shaped to simulate the indexing post of the flashcube illustrated in the above patent. In this manner, actuating member 24 is lifted into a position ready to initiate flashlamp firing.

Array 10 is a removable flashlamp unit and, like the flashcube, amy be fabricated of inexpensive materials on automated manufacturing equipment to provide a disposable package. The construction of the flashlamp array can best be understood by reference to FIGS. 1 and 3-5. Briefly, the unit comprises a base member 30 having eight percussively-ignitable flashlamps 31-38 and eight respectively associated preenergized striker springs 41-48 mounted on its upper surface. The flashlamps are arranged in two parallel rows of four lamps each, and each of the preenergized striker springs is positioned in operative relationship with a respective one of the lamps. Disposed between the two rows of flashlamps 31-34 and 35-38 are two arrays 50 and 52 of substantially concave reflectors arranged back-to-back to face in opposite directions. To complete the unit, the assemblage of lamps, striker springs and reflectors is enclosed in a transparent cover 54 secured to the base 30.

Each of the lamps 31-38 is substantially indentical and comprises (FIG. 5) a hermetically sealed light transmitting envelope 56 having a primer depending therefrom and a filling of combustible foil 58 and a combustion-supporting gas disposed therein. The primer comprises a metal tube 60 within which a wire anvil and a charge of fulminating material are disposed. Each lamp is vertically supported on the base 30 by means of a respective bore 62 into which the primer tube 60 is inserted.

Figure 5:
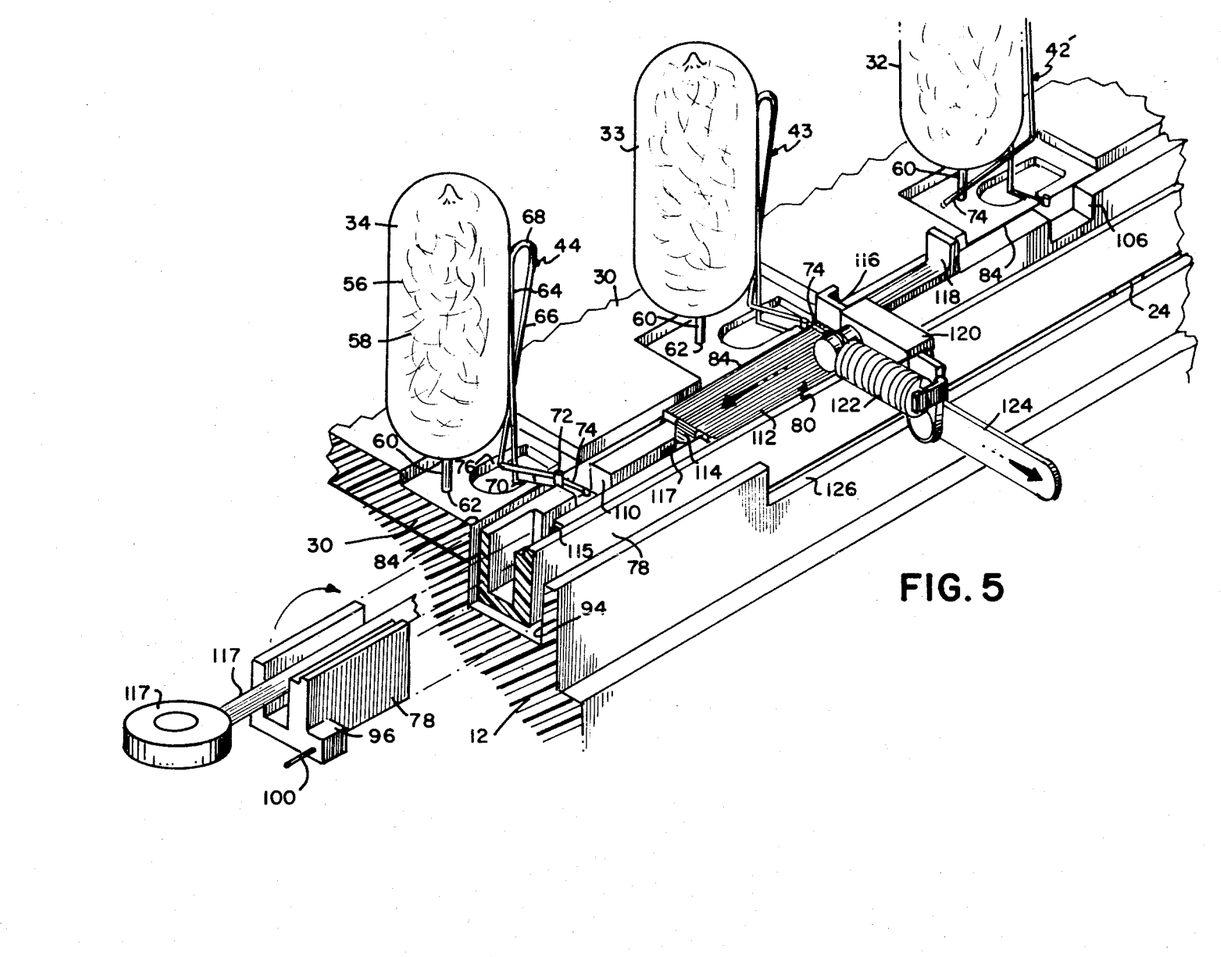
FIG. 5 is a fragmentary perspective view on an enlarged scale showing the relationship of the flashlamps, torsion springs and selective actuating mechanism in the photoflash assembly of FIG. 1, except that the slide member is displaced to illustrate a single lamp firing position intermediate the end lamps of the array.

Each of the preenergized striker springs 41-48 is substantially identical and comprises a folded torsion device typically formed from 0.021 inch music wire about 2.5 inches long. Referring to FIG. 5 and the numerically identified elements of spring 44, the wire is shaped to form a hairpin torsional section having segments 64 and 66 and a bight 68. The end portion of segment 64 is shaped to define a stationary supporting foot 70, the tip of which is shaped to define a catch 72. The end portion of segment 66 is shaped to define a striker 74, which when the spring is preenergized, or cocked, as shown, crosses over the supporting foot 70 and is retained by catch 72. The stationary supporting foot is seated in an elongated slot formed in the base 30, the slot being sufficiently shallow so that the catch 72 formed on the free end of foot 70 will project a relatively substantial distance above the upper surface of the base 30.

Initially the striker 74 may be formed at an angle of about 90° to the stationary supporting foot 70, although the angle through which the striker is rotated to position it behind catch 72, as shown, may be of any value that does not cause overstressing of the wire. The upper surface of base 30 is shpaed to provide a suitable bearing surface 76 for the heel of the striker during cocking. This bearing surface also aids in preventing accidental displacement of the spring sufficient to free the striker from the catch some time after cocking and before firing is intended.

Figure 4:
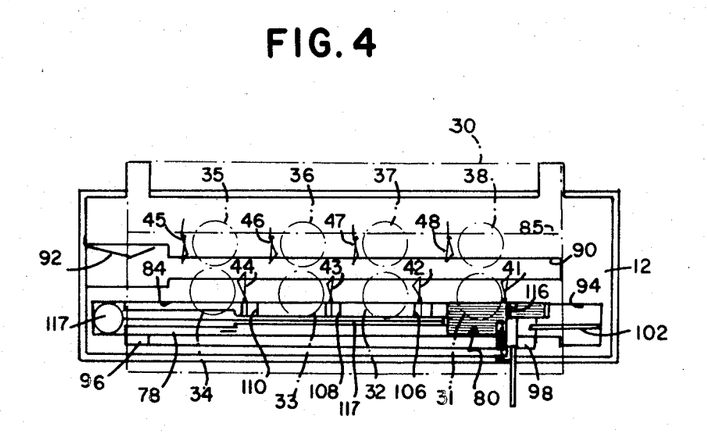
FIG. 4 is a plan view of the photoflash assembly of FIG. 1 with the actuating mechanism shown in full, and significant portions of the array, including the several flashlamps and associated torsion springs, shown in phantom.

Displacement of the cocked striker 74, to release it from the catch 72 and thus permit it to strike the primer tube 60 and fire the lamp, is effected by a selective actuating mechanism including a channel member 78 pivotally mounted in the support member 12 and slide member 80 retained in the channel 78. As will be described in detail hereinafter, the slide member is operative to engage the striker 74 of the lamp to be fired and to push the striker upward and thereby release it upon pivotal actuation of the channel member. In order to permit this engagement and release operation, the base 30 is shaped to define access means 82 (FIG. 6) adjacent to each of the strikers of springs 41-44 whereby clearance is provided for the operating motion of the slide and channel members. As illustrated in FIGS. 4 and 5, each cocked striker 74 of the springs 41-44 projects beyond a boundary 84 of the base defined access means 82 to overlie a portion of the channel member 78. For purposes of illustration to be discussed hereinafter, spring 42 is shown in the released (uncocked) condition in FIG. 5 and therefore is designated 42'.

The preenergized striker springs 45-48 associated with lamps 35-38 are mounted in a direction opposite to that of springs 41-44, as indicated in FIG. 4. Hence, base 30 also defines a symmetrically disposed access means 83 (FIG. 6) adjacent to the strikers of springs 45-48 which has a boundary 85 (FIG. 4) beyond which the cocked strikers of these springs project.

Figure 3:
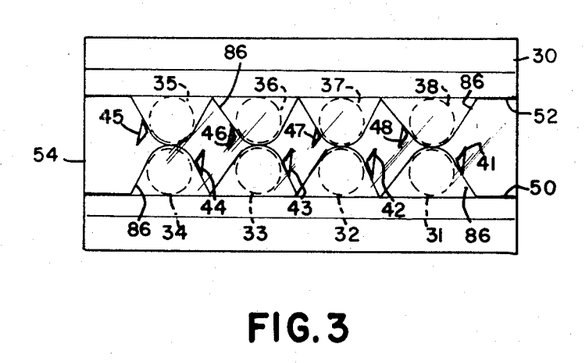
FIG. 3 is a top view of the percussive array in accordance with the invention showing the back-to-back arrangement of the reflectors and the relative location of the torsion springs.

The reflector arrays 50 and 52 are substantially identical; each comprises a strip of preformed sheet material having a light reflective coating and defining a set of four inwardly dished, individual light reflector surfaces 86 of suitable shape for fitting about respective ones of the flashlamps. As shown in FIGS. 1 and 3, each reflector 86 of array 50 is disposed behind a respective one of the flashlamps of the row 31-34. Hence, upon ignition of one of the flashlamps 31-34, the surface 86 behind that lamp reflects light toward the object being photographed by camera 14.

The four reflectors of array 52, on the other hand, are respectively disposed behind the four flashlamps of row 35-38 (FIG. 3) so as to face in the opposite direction from that of the reflectors of array 50. As illustrated by FIGS. 1, 3, 4 and 6, therefore, the removable flash unit 10 comprises a symmetrical arrangement of reflectors, lamps, springs and access means for providing two operative flashlamp arrays facing in opposite directions. The hairpin torsional sections of the springs are located behind the reflectors (FIG. 3), with a clearance being provided along the lower edges of the reflectors to permit free operation of the strikers.

Figure 6:
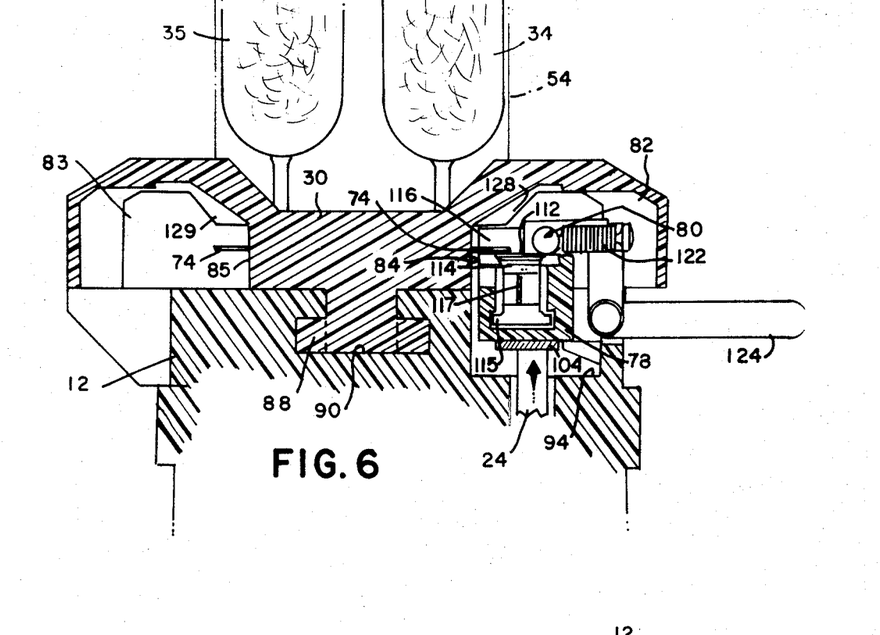
FIG. 6 is an enlarged scale sectional view on line 6—6 of FIG. 1 which illustrates the interface of the flashlamp array unit with the support member, including the access means provided for the selective actuating mechanism.

The base member 30 is adapted to be removably mounted on support member 12 by means of a tongue portion 88 which depends from the lower surface of base 30 along its longitudinal axis (FIGS. 1 and 6). Tongue 88 is shaped to be complementary with a groove, or guide 90 in support member 12 (FIGS. 1, 4, 6 and 7) whereby the base 30 may be slidably engaged upon the support member. In addition to providing for ease of flash unit replacement, this slide mounting capability facilitates orientation of the back-facing array into the operative position, as the strikers of springs 45–48 will be accessible to slide member 80 through access means 83 only upon removing and remounting base 30 on the support member 12 to reverse the direction of the reflector arrays.

Base member 30 typically may be formed of a plastic material, such as an impact grade polystyrene, by injection molding. Cover 54 is preferably made of a single molded piece of inexpensive plastic, such as polystyrene, and shaped to enclose the lamps, springs and reflectors over the upper surface of base 30. The lower portions of the cover 54 may then be affixed to the base 30 by adhesive, heat sealing, or sonic sealing.

Figure 7:
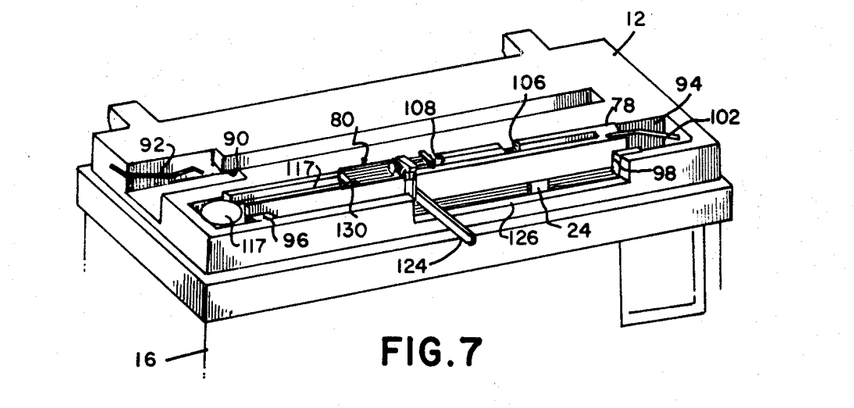
FIG. 7 is a fragmentary perspective view of the assembly of FIG. 1 with the flashlamp array removed, thereby showing the support member and selective actuating mechanism with the slide member displaced to the end of the channel.

The overall details of the support member and selective actuating mechanism are best illustrated in FIGS. 4 and 7. As previously mentioned, support member 12 is shaped to define a longitudinal guide 90 adapted to slidably receive and removably engage the tongue portion 88 of base member 30 (FIGS. 1 and 6). Secure engagement of base 30, when the flashlamp array 10 is mounted, is provided by a spring 92 located on the support member at the open end of guide 90. The support member also contains a longitudinal recess 94 parallel to the guide 90 and within which channel member 78 is pivotally mounted, thereby supporting it parallel to the row of flashlamps 31–34 (FIG. 4). More specifically, channel member 78 is mounted on a pair of hinges 96 and 98, the pin 100 of hinge 96 being visible in FIG. 5. Support member 12 and channel member 78 can both be formed of a plastic material, such as that used for base 30, and the hinges 96 and 98 may comprise a first set of pin holders molded at respective ends of the channel member and a second set of mating pin holders molded at respective ends of the recess 94. The channel member is spring loaded to urge it into the recess 94 by means of a wire spring 102 located at one end of the recess.

The recess 94 of support member 12 is formed so that the mechanical actuating member 24 of camera 14 is disposed in recess 94, with the assembly being dimentioned and arranged so that actuating member 24 engages the underside of channel member 78 for pivotally displacing the channel member when operated to move upward by the camera shutter mechanism. A pad 104 may be provided on the underside of the channel member (FIG. 6) to provide a bearing surface for actuating member 24. If the camera of the aforementioned U.S. Pat. No. 3,602,618 is used, spring 102 is sufficient to prevent pivotal displacement of channel member 78 when member 24 is in the "sensing" position described in that patent, and support member 12 is shaped to permit rotation of socket 26 (FIG. 2) and thus retraction of member 24 from its fully extended firing position.

To avoid releasing all but the selected lamp strikers when it is displaced to swing upwardly, the channel member 78 contains a plurality of clearance slots 106, 108 and 110 respectively aligned with the strikers of springs 42, 43 and 44, as illustrated in FIG. 4. A slot is not required for spring 41 as it is the first to be released on that side of the array.

As best shown in FIGS. 5 and 6, slide member 80 includes a plate portion 112 shaped to cover a selected one or more of the clearance slots and a depending tongue portion 114 for slidably engaging a complementary groove 115 in the channel member. Typically, the slide member components are fabricated of metal. Mounted on plate 112 is a releasable latch 116 for engaging a preenergized striker 74 of one of the firing springs. The slide member is spring loaded so as to be urged toward one end of the channel member by means of substantially constant force spring 117 connected between the slide member 80 and one end of channel member 78 (FIGS. 4 and 7). More specifically, the unextended body of the spring 117 may be mounted in a space provided at one end of recess 94 adjacent to the open end of the channel member. Consequently, the position of slide member 80 along channel member 78 is determined by the engagement of slide member latch 116 with one of the preenergized strikers 74. Accordingly, release of a striker to fire a lamp, as shown by spring 42' in FIG. 5, disengages the slide member to permit it to advance toward the open end of the channel member 78 unitl engagement with the next preenergized striker, as exemplified by spring 43 in FIG. 5.

The shape of plate 112 and location of latch 116 are such that the slide member plate normally underlies only the projecting striker engaged by latch 116, as illustrated by FIG. 5 wherein the plate 112 covers clearance slot 108 and underlies the striker 74 of spring 43. In this position, only one striker will be released (the striker of spring 43 in FIG. 5) upon pivotal actuation of the channel member by the upward movement of camera member 24. To enable the firing of two of the flashlamps simultaneously, a release mechanism is provided for disengaging the latch 116 from a striker, and a stop 118 is provided, in the form of a projection from plate 112 spaced from latch 116, for functioning as an alternative striker engaging means. The latch release mechanism includes: a member 120 within which the latch 116 is slidably retained; a spring 122 connected to urge the latch toward the row of strikers; and a handle 124 by which the latch may be manually released from engagement with a striker by pulling outward from the camera, away from the array. Clearance for handle 124 is provided by a long notch 126 provided along the front of support member 12.

In operation, camera 14 is prepared for flash operation by mounting a flashlamp array 10 onto the support member 12 attached to the camera. This is accomplished by fitting the tongue 88, which depends from the base of the array, into the open end of guide 90 and sliding it all the way into the guide until it stops at the closed end. Spring 92 securely retains the array in place, and spring 102 retains channel member 78 in a quiescent position with respect to the preenergized strikers. At this time, slide member 80 will be positioned as shown in FIGS. 1 and 4, with latch 116 engaging the striker of spring 41. Hence, the first lamp, 31, is selected for firing. Upon depressing lever 18 to "snap a picture," the camera mechanism actuates member 24 to move upward, thereby rotating channel member 78 about its hinge pins, as illustrated by the arrow about pin 100 in FIG. 5. The resulting upward swing of plate 112 pushes the striker 74 upwardly a distance sufficient to clear the top of catch 72, thereby releasing the striker to swing clockwise (as viewed from above) and to hit and indent the impact sensitive primer tube 60 at a high velocity to cause deflagration of the fulminating material located therein and thus ignite the combustible foil 58. In this manner, only lamp 31 is fired, the other three strikers being cleared by slots 106, 108 and 110.

After initiating the firing of lamp 31, slide member 80 automatically advances to the next preenergized striker spring 42, since the release of spring 41 disengages its striker from latch 116 to permit the slide member to be pulled down the channel 78 by spring 117. The travel of the slide member will then be stopped when latch 116 engages the next projecting striker. To prevent slide member 80 from advancing down channel 78 when in the actuated (tilted) position, base 30 is shaped to provide projections 128 into access means 82, and like projections 129 in access means 83, as illustrated in FIG. 6. Hence, the shape of the access means permits motion of the slide member only when the channel member is in its quiescent condition, thereby precluding the latch from bypassing a projecting striker.

In the second position of the slide member, whereby latch 116 engages the striker of spring 42, plate 112 covers slot 106. Hence, the next actuation of the camera shutter mechanism causes lamp 32 to be fired, whereupon the slide member automatically advances to the projecting striker of spring 43. FIG. 5 shows the deenergized spring 42' and the slide member 80 in position to fire lamp 33.

Figure 8:
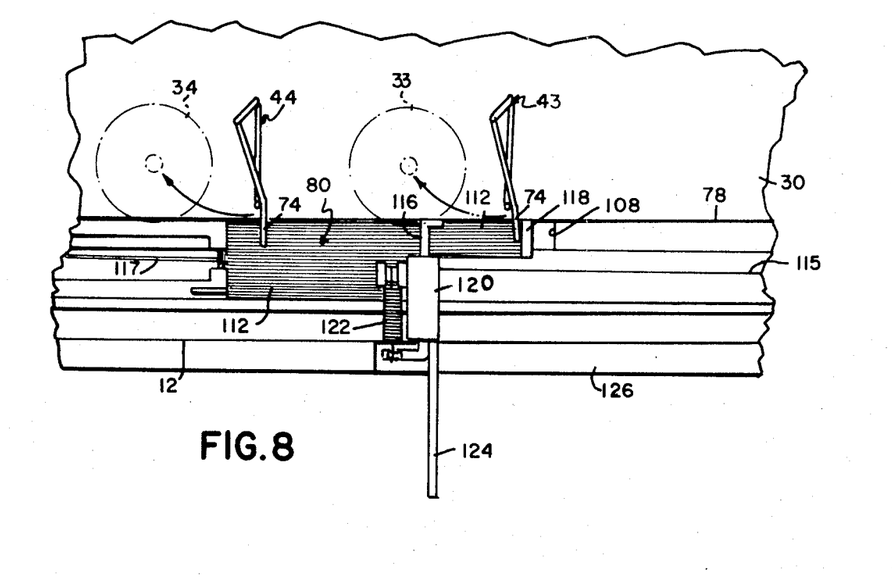
FIG. 8 is a fragmentary plan view on an enlarged scale showing the slide member positioned to fire two lamps simultaneously.

Assume it is now desired to provide increased light output for a given photographic situation by firing two lamps simultaneously. This mode of flashunit operation is provided by pulling handle 124 outward to disengage the latch and permit the slide member to advance down channel 78 until a preenergized striker is engaged by stop 118. This position of the slide member is illustrated by FIG. 8, wherein plate 112 covers the necessary portions of slots 108 and 110 and underlies the strikers of springs 43 and 44. With this arrangement, actuation of the shutter mechanism causes the upward tilting plate 112 to release both strikers to fire lamps 33 and 34 simultaneously.

The lamp firing sequence described above serves as but one example of several available patterns. Obviously, all four lamps may be fired individually, or as two double shots, or as a single-double-single pattern, or a double-single-single pattern. Further, as illustrated in FIG. 7, the last position of slide member 80 may be determined by an end stop such as a small peg 130 in channel member 78, in lieu of latch 116.

When lamps 31–34 are expended, the array 10 is slidably removed from support member 12, reversed, and remounted to place the unused lamps 35–38 and preenergized strikers 45–48 adjacent to the channel member 78. Lamps 35–38 may then be fired in the same manner as described for lamps 31–34.

Although the invention has been described with respect to a specific embodiment, it will be appreciated that modifications and changes may be made by those skilled in the art without departing from the true spirit and scope of the invention. For example, the configuration of base member 30, and the access means 82 and 83 provided therein, need not be limited to that illustrated. A variety of alternative mounting configurations may be employed. The flashlamp array may comprise but a single row of any reasonable plurality of lamps in lieu of 4/4 bidirectional arrangement of the described embodiment. Further, the selective actuating mechanism comprising the channel member 78, with its springs and slide plate, may be supported within the flash array base member without the need for a separate support member 12, thereby making the removable flashlamp array a self-contained unit for mounting on a camera having a simple actuating finger.

What we claim is:

1. A photoflash assembly comprising, in combination:
   a base member;
   a plurality of percussively-ignitable flashlamps mounted in a row on said base member;
   a plurality of preenergized strikers mounted on said base member and individually releasable to fire a respective one of said flashlamps;
   said base member defining access means adjacent each of said strikers for enabling engagement with and release of each preenergized striker;
   a channel member;
   means pivotally supporting said channel member parallel to said row of flashlamps; and
   a slide member retained in said channel member and having means engaging one of said preenergized strikers through said access means;
   said slide member being operative upon pivotal actuation of said channel member to release the striker with which it is engaged to fire a respective one of said flashlamps.

2. The assembly of claim 1 further including means urging said slide member toward one end of said channel member whereby the position of said slide member along said channel member is determined by the engagement of said slide member with one of said preenergized strikers, and wherein release of said striker disengages it from said slide member to permit said slide member to advance toward the end of said channel member toward which it is urged until engagement with the next preenergized striker.

3. The assembly of claim 2 wherein said urging means comprises a spring of substantially constant force connected between said slide member and said one end of said channel member.

4. The assembly of claim 2 further including means for spring loading said pivotally supported channel member to normally assume a quiescent position with respect to said preenergized strikers.

5. The assembly of claim 2 wherein said base member defines upper and lower spaced surfaces; each of said flashlamps has a primer tube depending therefrom by which it is supported on the upper surface of said base; and said strikers are mounted on the upper surface of said base so that, in the preenergized condition, said strikers project beyond a boundary of said base defined access means to overlie a portion of said channel member.

6. The assembly of claim 5 wherein said slide member comprises a plate having a releasable latch mounted thereon for functioning as said striker engaging means, said plate normally underlying only the projecting striker engaged by said latch, and release of said latch to disengage it from a striker being operative to permit said plate to be shifted by said urging means to underlie at least two of said projecting strikers, whereby at least two of said strikers are released upon pivotal actuation of said channel member to simultaneously fire at least two of said flashlamps.

7. The assembly of claim 6 wherein said channel member contains slots for clearing said projecting strikers during pivotal actuation of said channel member, and said plate is shaped to cover the one or more clearance slots of said channel member which correspond to the one or more of said strikers selected for release to fire one or more of said flashlamps.

8. The assembly of claim 2 further including a support member upon which said base is removably mounted and which provides said means for pivotally supporting said channel member.

9. The assembly of claim 8 further including a camera having a mechanical actuating member, and wherein said support member is attached to said camera with said channel member accessible to be pivotally displaced by said actuating member to cause the firing of a selected one of said flash lamps as determined by the position of said slide member.

10. The assembly of claim 8 wherein said base member defines upper and lower spaced surfaces, each of said flashlamps of said first row has a primer tube depending therefrom by which it is supported on the upper surface of said base, each of said first plurality of preenergized strikers are mounted on the upper surface of said base, and further including a second row of percussively-ignitable flashlamps mounted on the upper surface of said base parallel to said first row of flashlamps, each of the flashlamps of said second row having a primer tube depending therefrom, a second plurality of preenergized strikers mounted on the upper surface of said base member and individually releasable to fire a respective one of the flashlamps of said second row, a second access means defined by said base member adjacent each of said second plurality of strikers, first and second arrays of substantially concave reflectors located between said first and second rows of flashlamps and arranged back-to-back to face in opposite directions, each reflector of said first array being disposed behind a respective one of the flashlamps of said first row and each reflector of said second array being disposed behind a respective one of the flashlamps of said second row, and a transparent cover mounted on said base and enclosing said flashlamps, strikers and reflectors, said second plurality of strikers being accessible to said slide member through said second access means only upon removing and remounting said base on said support member to reverse the direction of said first and second arrays of reflectors.

11. The assembly of claim 10 wherein each of said preenergized strikers is a portion of a folded torsional spring comprising a substantially hairpin torsional section having two segments joined by a bight, said striker portion projecting from one of said segments, a supporting foot projecting from the other of said segments and fixedly mounted on the upper surface of said base, and a catch formed at the tip of said foot, said striker portion crossing said foot with said catch restraining said striker portion in a cocked condition, the springs providing said first plurality of strikers being mounted on said base so that each cocked striker projects beyond a boundary of said base defined access means to overlie a portion of said channel member.

12. A selective actuating mechanism for a photoflash lamp array; said array including a base, a plurality of percussively-ignitable flashlamps mounted in a row on said base, a plurality of preenergized strikers mounted on said base and individually releasable to fire a respective one of said flashlamps, and access means defined in said base adjacent each of said strikers for enabling engagement with and release of each preenergized striker; the selective actuating mechanism comprising:
a support member defining a longitudinal recess and receiving means whereby said array may be removably mounted thereon;
a channel member pivotally mounted within said longitudinal recess;
a slide member retained in said channel member and having means adapted for engaging one of the preenergized strikers of said array through said access means; and
means for urging said slide member toward one end of said channel member.

13. The mechanism of claim 12 further including means for spring loading said channel member to urge it into said recess.

14. The mechanism of claim 12 wherein said urging means comprises a spring of substantially constant force connected between said slide member and said one end of said channel member.

15. The mechanism of claim 12 wherein said channel member contains clearance slots adapted to be aligned with the strikers of said array, and said slide member comprises a plate shaped to cover a selected one or more of said slots.

16. The mechanism of claim 15 wherein said slide member further includes a spring loaded latch mounted on said plate for functioning as said striker engaging means, and a projection from said plate spaced from said latch for functioning as an alternative striker engaging means.

17. The mechanism of claim 12 wherein said receiving means comprises a longitudinal guide defined by said support member parallel to said longitudinal recess and adapted to slidably receive and removably engage a complementary portion of the base of said array.

18. The mechanism of claim 12 wherein said support member is adapted to be mounted on a camera having a mechanical actuating member for pivotally displacing said channel member when operated.

19. The mechanism of claim 12 further including a camera having a mechanical actuating member, and wherein said support member is integrated with said camera, and said actuating member is disposed in said recess for pivotally displacing said channel member when operated.

* * * * *